US012567512B2

(12) United States Patent
Gacsal

(10) Patent No.: US 12,567,512 B2
(45) Date of Patent: Mar. 3, 2026

(54) METHOD FOR THE PRODUCTION OF METAL RADIOISOTOPES AND APPARATUS FOR THE IMPLEMENTATION OF THE METHOD

(71) Applicant: SYNIQ KFT., Biatorbágy (HU)

(72) Inventor: Károly Gacsal, Páty (HU)

(73) Assignee: SYNIQ KFT., Biatorbágy (HU)

( * ) Notice: Subject to any disclaimer, the term of this patent is extended or adjusted under 35 U.S.C. 154(b) by 426 days.

(21) Appl. No.: 18/014,854

(22) PCT Filed: Mar. 11, 2021

(86) PCT No.: PCT/HU2021/050021
§ 371 (c)(1),
(2) Date: Jan. 6, 2023

(87) PCT Pub. No.: WO2022/013585
PCT Pub. Date: Jan. 20, 2022

(65) Prior Publication Data

US 2023/0290531 A1 Sep. 14, 2023

(30) Foreign Application Priority Data

Jul. 16, 2020 (HU) .................................... P2000235

(51) Int. Cl.
*G21G 1/10* (2006.01)
*G21G 1/00* (2006.01)
(Continued)

(52) U.S. Cl.
CPC ............... *G21G 1/10* (2013.01); *G21G 1/001* (2013.01); *G21K 5/08* (2013.01); *G21K 5/10* (2013.01); *H05H 6/00* (2013.01)

(58) Field of Classification Search
CPC ............ G21G 1/001; G21G 1/10; G21K 5/08; G21K 5/10; H05H 6/00
See application file for complete search history.

(56) References Cited

U.S. PATENT DOCUMENTS 5,392,319 A 2/1995 Eggers
5,608,224 A * 3/1997 Alvord ...................... G21K 5/08
250/442.11

(Continued)

FOREIGN PATENT DOCUMENTS

EP 3274999 A1 1/2018
KR 101796942 B1 11/2017

OTHER PUBLICATIONS

International Search report PCT/HU2021/050021 dated Sep. 22, 2021 (pp. 1-6).

*Primary Examiner* — Sharon M Davis
(74) *Attorney, Agent, or Firm* — Csaba Henter; MILLEN, WHITE, ZELANO & BRANIGAN, P.C.

(57) ABSTRACT

Apparatus (10) for the production of radioisotopes that has a connection element (9) that may be connected to a radiation source, a foil holder block (8) connected to this connection element (9) and a first foil (80a) secured by the foil holder block (8) in a beam channel (11) delimited by the connection element (9), the foil holder block (8) and a cooling connection block (7) connected to this, a target holder (4) connected to the cooling connection block (7) and a target holder actuator (2) driving this, a dissolution chamber (5) that may be connected to the target holder (4), characterised by that the target holder (4) has two or more cavities (41), which cavities (41) are adapted for accommodating a target (42) and a dissolution chamber actuator (3) is connected to the dissolution chamber (5), and a method for producing radioisotopes in such an apparatus.

12 Claims, 2 Drawing Sheets

(51) Int. Cl.

| | |
|---|---|
| ***G21K 5/08*** | (2006.01) |
| ***G21K 5/10*** | (2006.01) |
| ***H05H 6/00*** | (2006.01) |

(56) References Cited

U.S. PATENT DOCUMENTS

| | | | | |
|---|---|---|---|---|
| 10,832,827 | B2 | 11/2020 | Masse et al. | |
| 2006/0023829 | A1 | 2/2006 | Schenter et al. | |
| 2017/0323696 | A1 * | 11/2017 | Kani | G21G 1/10 |
| 2018/0322972 | A1 | 11/2018 | Parnaste et al. | |
| 2019/0259505 | A1 * | 8/2019 | Murakami | H05H 6/00 |
| 2020/0359492 | A1 * | 11/2020 | Strangis | G21G 1/10 |

* cited by examiner

METHOD FOR THE PRODUCTION OF METAL RADIOISOTOPES AND APPARATUS FOR THE IMPLEMENTATION OF THE METHOD

THE FIELD OF THE INVENTION

The object of the present invention relates to a method for the production of metal radioisotopes using a particle beam and to an apparatus for the implementation of the method.

THE STATE OF THE ART

An important characteristic of radioisotopes (radionuclides) is their half-life, which specifies their rate of decay, and during which the number of atomic nuclei of the given radioisotope drops to a half. In the case of their use for medical purposes the dose of radiation the patient receives may be reduced by using radioisotopes with a short half-life. Due to this short half-life, in order to be able to put these materials to use it is necessary to produce them on a continuous basis, which production characteristically takes place in the course of nuclear transition caused as a consequence of the irradiation of certain chemical elements.

A nuclear reactor or a particle accelerator is needed to perform such irradiation, like, for example, a cyclotron, a linear accelerator or a synchrotron.

A significant proportion of medical diagnostic procedures use radioisotopes, for example when the path of a given element in the human body is traced using the radiation emitted by a radioisotope of that element. This can be done by a functional imaging technique, known as positron emission tomography. Similarly, radioisotopes are used in industry in innumerable places for radiolabelling, including for checking the integrity of lines and cables.

The most widely used radioisotopes in positron emission tomography (PET) are $^{18}F$ and $^{11}C$, which are produced in medical cyclotrons, developed to produce these radioisotopes completely automatically, without human intervention. The target materials, used for the irradiation, are in liquid or gas phase, therefore the insertion of the appropriate target into the irradiation chamber and the removal of the radioisotope following its production may be easily automated using pressure differences and valves.

As opposed to this, it is mainly solid target materials that are suitable for producing the metal radioisotopes widely used in diagnostics (scintigraphy, SPECT, PET), as metals are characteristically in solid phase at room temperature and the density of metals in their elemental state is greater than the density of metal salts and solutions. In the case of irradiation, the higher density results in proportionally higher magnitude of interaction with the beam. Additionally, the handling of solid targets represents a more complex automation task.

It is also possible to irradiate concentrated acidic metal salt solutions in a liquid target, however the activity of the radioisotope produced in this way is significantly lower and the long-term, reliable use of this method is questionable due to the presence of the strong acid.

In the case of the occasional production of low-activity radioisotopes the positioning and removal of the target may be performed manually if suitable safety measures are observed, however, for the wide-ranging use of metal radioisotopes in the production of medical diagnostics must be automated in the interest of the personnel safety and increasing efficiency.

The device with the simplest design suitable for the irradiation of solid target materials is the so-called coin target holder, which is adapted for accommodating discs that are 2 to 3 mm thick and approx. 30 mm in diameter. The device enables the irradiation of target materials applied to the surface of the discs or pressed into the cavity formed in the middle of the disc. After the disc is inserted a cooling chamber is pressed up against its rear side, via which the heat released during irradiation may be removed by circulated cooling water (e.g. IBA NIRTA [https://www.iba-radiopharmasolutions.com/products/target-technology]). Its disadvantage is that the insertion and removal of the discs is performed manually, or by using a pneumatic tube transport system developed for this purpose (TEMA Sinergie STTS rendszer [https://www.temasinergie.com/product/stts/] or Elex Commerce PT01 and PT02 systems [https://elexcom-m.com/products]).

Several solutions have been developed for transporting the fresh target material into the cyclotron room and removing the irradiated targets from the cyclotron room that use a pneumatic tube transport system, operating with a vacuum or compressed air in a large-diameter tube, created between the cyclotron and the hot cells.

The disadvantages of pneumatic tube transport systems are that they cannot be constructed for all accelerators, specific capsules must be used in a given pneumatic tube system, which determine the size of the targets to be transported, and the capsules must be regularly decontaminated (removal of surface contamination) and/or replaced, in addition the tube network is prone to damage and demands regular maintenance.

In order to ensure the wide use of short half-life metal radioisotopes it is necessary to be able to produce them locally, primarily using medical cyclotrons integrated with the existing infrastructure. The production of metal radioisotopes must be made possible with solid target systems adapted to the use of beam outputs and cooling systems optimized for the irradiation of liquid and gas targets. The most preferable way of transporting the produced radioisotopes into the hot cell is by moving the given metal as a solution via a thin capillary tube. The reason for this is that the separation, purification of the various radioisotopes takes place in the hot cell characteristically in the liquid phase, in addition tubes with a small cross-section are suitable for the transporting of material in the liquid phase, as they do not take up too much space and damage caused by impacts does not have to be considered. Furthermore, the cleaning of capillary tubes may be performed easily by rinsing, while this is rather complex in the case of large diameter tubes.

Apparatuses also exist in which several targets are irradiated at the same time by splitting the beam. Patent document with publication number WO0028796 A2 presents such a device. The most obvious disadvantage of such apparatuses is that the beam current is not increased, in other words a significantly lower beam current strikes the individual targets, meaning that the production of the individual radioisotopes takes place much more slowly. In other words, the use of such an apparatus does not save a significant amount of time, and it is unnecessarily intricate as dividing the beam is complex because devices containing magnets and/or crystals have to be installed to split the beam into several parts. Furthermore, due to the multiple beams much greater radiation shielding is required in order to use the apparatus.

Patent document with publication number US20180322972 A1 describes an apparatus serving for the dissolution of irradiated targets in situ. The document describes an apparatus in which several target assemblies may be placed and these target assemblies contain the target in the production chamber. The essence of the apparatus is that the target is formed in the target assembly in such a way that the electrode, the conductive base and the production chamber form an electrolytic cell. The electrolytic solution containing the metal ions is transferred into the production chamber, then by applying a voltage to it a metal coating is deposited onto the chamber wall from the electrolyte. The dissolution of the produced radioisotopes from the irradiated target takes place in this same chamber with the use of a chemical. The disadvantage of the apparatus is that the electrolysis, the irradiation and the dissolution take place in the same production chamber; therefore the entire chamber must be formed to be resistant to all of the chemicals used. In addition to this, electrolysis is a lengthy process; therefore the production of the target required for the use of the apparatus is a time-consuming and complex process. Furthermore, it is not possible to determine from the outside, whether the production of the target was successful. Additionally, the production chamber must be larger than the maximum height and width of the beam, therefore significant amounts of chemicals are required to completely fill up the chamber during the electrolysis and the dissolution processes. Apart from this in order to use the apparatus it needs cooling and gas to adjust the pressure, for which separate pipes and capillaries are required in addition to the electrolysis and dissolution pipes and capillaries, which require space and increase the complexity of the apparatus.

Another apparatus is described for the dissolution of irradiated target materials in the target [William Z. Gelbart and Richard R. Johnson, Instruments 2019, 3, 14], which is primarily used in the case of medium-sized cyclotrons. Due to its space demand this apparatus may be primarily installed at the so-called beam line, which beam line is a tube system under high vacuum, adapted for guiding the cyclotron's beam over larger distances.

Such beam lines are usually installed in research cyclotrons and medium or high-energy radioisotope production cyclotrons.

The apparatus described in the article is characteristically capable of automatically transporting 10 prepared targets into the path of the beam and following irradiation they are turned over and sealed together with a dissolution chamber. During irradiation, the targets are positioned at compared slanted angle to the beam, in this way the particles colliding into their surface are spread out over a larger area, and due to this the developing heat can be dissipated more effectively. The disadvantage of the design is that it is only able to handle target materials applied as a thin metal coating, which coatings are produced by lengthy electrolysis and/or evaporation coating. In addition to this, in order to improve heat dissipation these targets have to be provided with cooling ribs. The liquids required for the dissolution are transferred into the dissolution chamber from storage vessels located outside the room via capillary tubes and the obtained solution is also transported out of the room through capillary tubes.

The apparatus takes the prepared targets from a cassette using three pneumatic cylinders and turns them over to press them into the irradiation position. After the targets have been irradiated a pneumatic cylinder places the target into a dissolution chamber, through which a fluid suitable for dissolving the irradiated metal is circulated. After the radioisotopes have been dissolved from the target the pneumatic cylinder releases the specific target into a lead container located under the apparatus.

The use of the single-use targets with their relatively complex design and cooling ribs, as well as the lengthy preparation steps make the operation of such an apparatus costly, furthermore due to the small angle of incidence of the beam thicker, pellet type targets cannot be used, because the beam is unable to penetrate into the deeper layers of the target. Furthermore, every target has to be stored in a separate target holder, which increases the space required by the apparatus and the amount of equipment to be decontaminated and, thereby the operation costs. In addition, the pneumatic cylinder either holds the target in the irradiation position or in the dissolution position, the two positions together are not possible, therefore further irradiation cannot be performed during dissolution.

As a consequence of the above there is a requirement for an apparatus that may be remotely controlled to irradiate solid targets and perform dissolution in such a way that the dissolution of the radioisotope takes place within the apparatus and another target may be irradiated while dissolution of the previous target is being performed. Furthermore, it is necessary for it to enable the use of coating, film and pellet type targets as the solid targets in the apparatus so that as wide a range of radioisotopes as possible may be optimally produced with the apparatus. Furthermore, it is necessary to minimize the amount of target holders to be decontaminated or treated as waste. Additionally, it should be possible to manufacture the individual elements, such as the targets and the target holders, as quickly as possible.

Similar apparatuses, used for the production of radioisotopes typically consist of a connection element, which is connected to the apparatus that produces the beam, a foil holder block connected to the connection element, which closes off the part of the beam channel located near to the radiation source, and a cooling connection block connected to the foil holder block which supplies the other part of the beam channel with coolant. The target holder may be moved with a target holder actuator so that it becomes connected to the beam channel or to the dissolution chamber. In addition, the target holder is cooled by a cooling chamber, that can be moved by a cooling chamber actuator.

BRIEF DESCRIPTION OF THE INVENTION

The present invention is based on the recognition that if the target holder is created to be adapted for the storage of several solid targets, then irradiation may be continued on another target using the same beam while the produced radioisotopes are being chemically dissolved from the previous target.

In accordance with the description above, the present invention relates to an apparatus that has a connection element adapted for connection to a radiation source, a foil holder block connected to this connection element and a first foil secured by the foil holder block in a beam channel delimited by the connection element, the foil holder block and a cooling connection block connected to this, a target holder connected to the cooling connection block and a target holder actuator driving this, a dissolution chamber that may be connected to the target holder, and it is a characteristic of the apparatus that the target holder has two or more cavities, which cavities are adapted for accommodating a target and a dissolution chamber actuator is connected to the dissolution chamber.

According to a preferred embodiment of the apparatus according to the invention the target holder is adapted for accommodating a pellet, coating or foil type target, preferably a pellet type target.

According to a preferred embodiment of the apparatus according to the invention the apparatus also contains a cooling chamber that may be connected to the target holder and a cooling chamber actuator driving this.

According to a preferred embodiment of the apparatus according to the invention the target holder is linear or disc-shaped.

According to a preferred embodiment of the apparatus according to the invention the target holder is provided with teeth at least on one of its edges for moving the target holder.

According to a preferred embodiment of the apparatus according to the invention the apparatus also contains a second foil that is secured in the beam channel by the foil holder block.

According to a preferred embodiment of the apparatus according to the invention the cooling chamber and the dissolution chamber are provided with O-ring seals.

According to a preferred embodiment of the apparatus according to the invention the material of the target holder is chemically resistant metal, according to an even more preferred embodiment it is anodised aluminium.

Furthermore, the present invention relates to a method for the production of radioisotopes, which method contains the following steps:

a) loading a target holder (4) into an apparatus (10);
b) starting a beam in a beam channel (11);
c) irradiating a target (42);
d) moving the target holder (4) into a subsequent irradiation position;
e) securing a dissolution chamber (5) around the irradiated target (42) of the target holder (4);
f) pumping dissolution material into the dissolution chamber (5) and draining off the dissolution material;
g) irradiating a subsequent target (42);

where steps a)-f) are performed consecutively, and the implementation of step g) may take place simultaneously with step e) and/or step f) or following this.

In the case of a preferred embodiment of the method according to the invention steps e) to f) and g) take place simultaneously.

A preferred embodiment of the method according to the invention furthermore contains the following steps:

h) securing a cooling chamber (6) on the target holder (4) before irradiation;
i) circulating coolant in the cooling chamber (6);
j) separating the cooling chamber (6) following irradiation.

The object of the present invention also relates to a target holder for the production of radioisotopes, which has two or more cavities for accommodating targets, furthermore its material is chemical-resistant metal, according to a preferred embodiment it is anodised aluminium.

According to a preferred embodiment of the target holder according to the invention, the target holder has first teeth at least on one of its edges for moving the target holder.

According to a preferred embodiment of the target holder according to the invention the target holder also has bores on at least one of its edges and switches for determining the position of the cavities.

DETAILED DESCRIPTION OF THE INVENTION

The essence of the apparatus according to the invention is that the target holder is capable of storing several types of target, such as coating, foil and pellet type targets, in such a way that while the one target is being subjected to dissolution and then transported to a hot cell, the irradiation of the second target may be started, or, optionally, fully conducted.

In the context of the present invention target is understood to mean a material or material mixture that when irradiated produces the desired radioisotopes as a result of nuclear reactions. Generally, the target may be in gas, liquid or solid state, and the present invention relates to an apparatus to be used with solid targets.

In the context of the present invention target holder is understood to typically mean a component made from metal that holds the target material to be irradiated. It has an important role in dissipating the heat created in the target material by the beam during irradiation and in closing off or sealing the element in which the coolant liquid and/or gas cooling the target material is circulated.

In the context of the present invention radiation source is understood to mean apparatuses that emit a controlled beam of charged particles or neutrons. Such apparatuses include, for example, a cyclotron, synchrotron, or a nuclear reactor provided with a beam channel.

Figure 1:
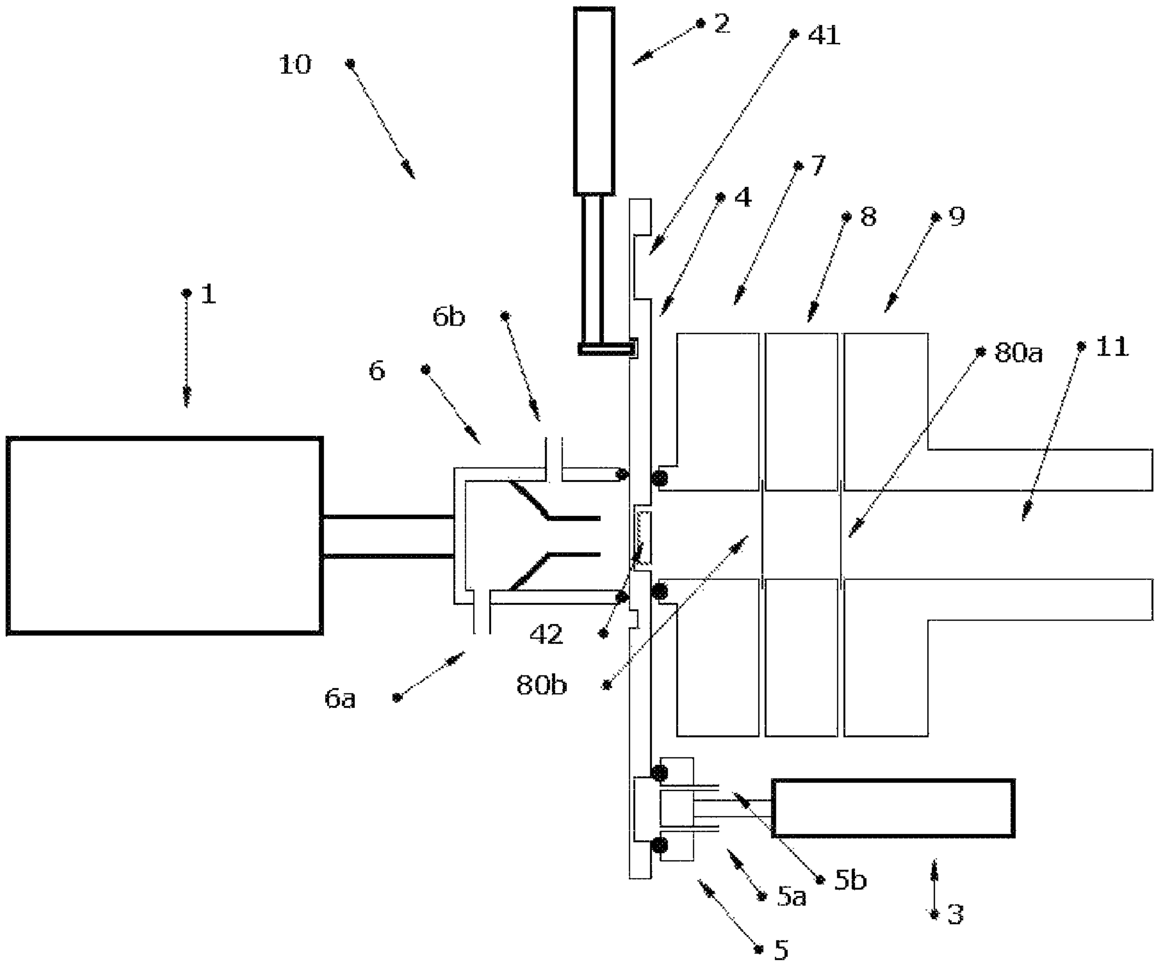
FIG. 1 depicts a top view of the apparatus according to the invention.

The main parts of the apparatus marked overall in FIG. 1 with reference sign 10 are the target holder 4, the dissolution chamber 5 and the cooling chamber 6. The cooling chamber 6 may be moved with the cooling chamber actuator 1, the target holder 4 with the target holder actuator 2 and the dissolution chamber 5 with the dissolution chamber actuator 3.

The apparatus 10 is connected to the radiation source (not depicted) that produces the beam, preferably a cyclotron, with the connection element 9, which connection element 9 is formed depending on the structure of the radiation source providing the beam, as is obvious for a person skilled in the art. The foil holder block 8 is connected to the connection element 9, and the role of the foil holder block 8 is to support the first foil 80*a* and the second foil 80*b*, which are positioned in the beam channel 11. The cooling connection block 7 circulates coolant between the first foil 80*a* and the second foil 80*b* to dissipate the heat generated by the beam in the first foil 80*a* and the second foil 80*b*. The coolant is preferably helium, but other gases may be used that are suitable for performing cooling and that do not, or only minimally, react with the structural elements or with the beam.

The target holder 4 stores the targets 42 that are adapted for producing a given radioisotope on being irradiated. The target 42 may be a coating, foil or pellet type target 42. The problem with coating or foil type targets 42 is that they may burn out due to local overheating and securing them is also difficult. The production of coating type targets 42 requires electrolysis and evaporation, which is a costly and complex process lasting several hours. Also, foil type targets 42 may be produced by cutting a thin foil to size, which are then stretched onto the target holder 4. Targets 42 of this type are exceptionally fragile, are prone to local overheating and may become punctured, a further disadvantage of these is that they contain a small amount of material. The production of pellet type targets 42 takes place by compressing the powder required for the material of the target 42, in the course of which the pellets produced may be easily placed in the cavities 41 formed for this purpose in the target holder 4. These pellet type targets 42 are less fragile, less sensitive to heat, the size of the cavity 41 determines how much material they may contain, and they may be produced in a simple way. Furthermore, any faults occurring in pellet type targets 42 that were incorrectly produced are visible to the naked eye, while any faults or structural deviations occurring in the case of coating or foil type targets 42 that are not visible to the naked eye may represent a problem during irradiation. Therefore pellet type targets 42 are used in the context of the present invention, but, naturally, the use of coating or foil type targets 42 is not excluded in the apparatus 10 according to the present invention.

Two to twenty cavities 41 may be formed in the target holder 4 for the positioning of pellet type targets 42. According to the invention preferably two, three, four, five, six, seven, eight, nine, ten, eleven, twelve, thirteen, fourteen, fifteen, sixteen, seventeen, eighteen, nineteen or twenty cavities 41 are preferably formed in the target holder 4. For the majority of radioisotopes this number of targets 42 is sufficient even for as much as a week of uninterrupted operation. There is no theoretical obstacle to forming even more than twenty cavities 41, as the number of cavities may be obviously increased either by increasing the size of the target holder 4 or by reducing the distance between the cavities 41.

Figure 2A:
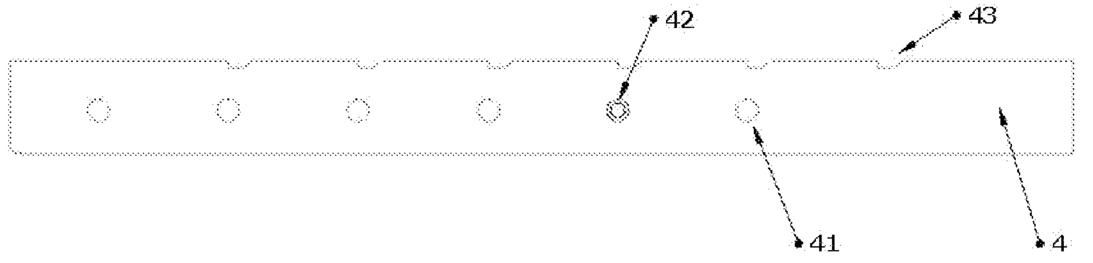
FIG. 2*a* depicts a linear-shaped embodiment of the target holder according to the invention.
Figure 2B:
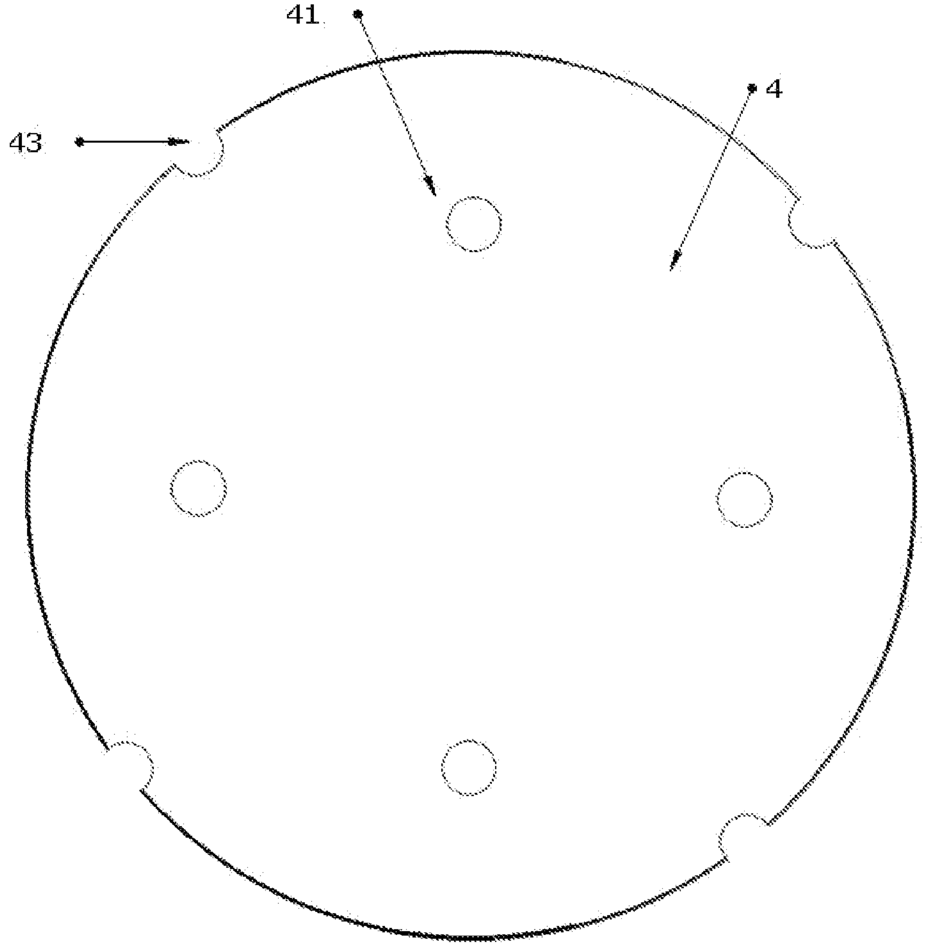
FIG. 2*b* depicts a disc-shaped embodiment of the target holder according to the invention.

FIG. 2 illustrates the target holder 4, which may have a linear, strip shape (FIG. 2*a*), or a disc shape (FIG. 2*b*), but even other geometrical shapes are conceivable that the target holder actuator 2 is able to move and that the dissolution chamber 5 and the cooling chamber 6 may be attached to without leakage. Cavities 41 are formed in the target holder 4 for pellet, coating or foil type targets 42, into which the targets 42 may be placed. These cavities 41 preferably follow each other sequentially on the target holder 4, but it is also possible that the distance between the individual cavities 41 varies and that the distance of the cavities 41 from the edge of the target holder 4 also varies. In addition to this, naturally, the sizes of the cavities 41 within one target holder 4 may also vary depending on the sizes of the targets 42. It is preferable to provide first teeth 43 at the edge of the target holder 4 so that the target holder actuator 2 may easily move the target holder 4 to the positions determined by the first teeth 43.

Bores (not shown) adapted for identifying the individual cavities 41 may also be positioned on the edge of the target holder 4, which make it possible for suitably located detectors (such as a lever microswitch) to monitor the cavities (41). In the case of electrical switches the on and off switched statuses determined by the shape of the target holder 4 may be transformed into identification numbers in correspondence with the binary number system. With up to four cavities with two switches a 2-bit identification number may be generated, with up to eight cavities with three switches a 3-bit identification number may be generated, with up to 16 cavities with four switches a 4-bit identification number may be generated, and with up to 32 cavities with five switches a 5-bit identification number may be generated. The bores may also be formed in the shape of second teeth or indentations.

In order to increase its capacity to withstand dissolution agents the target holder 4 is also provided with an anodised protective coating.

In order to perform irradiation the target 42 is placed in a given target holder 4, this given target holder 4 along with the target 42 positioned in it is moved into the irradiation position with the target holder actuator 2 and is then irradiated with charged particles, such as a $H^+$ (proton), $D^+$ (deuterium ion) or $He^{2+}$ (a particle) beam, particularly preferably with a $H^+$ beam. The irradiation is preferably performed in a cyclotron, but for the production of certain radioisotopes the use of a synchrotron or nuclear reactor provided with an irradiation channel, or possibly a linear particle accelerator may be optimal. The types of particle, and their energy, that need to be used for irradiation in order to produce the individual types of radioisotope and the radiation sources required for this are obvious for a person skilled in the art.

The energy of the beam (usually 5-100 MeV in the case of $H^+$ irradiation) determines the type of nuclear reaction taking place as well as the depth of the penetration of the charged particles into the target 42. The amount of radioisotope produced depends on the beam current used (preferably 10 to 100 uA) and the duration of irradiation (preferably 10 to 180 minutes).

For example, during irradiation the beam produced by the cyclotron while progressing through the beam channel penetrates through the first foil 80*a* and the second foil 80*b* held by the foil holder block 8. The purpose of the first foil 80*a* is to seal off the vacuum maintained in the cyclotron, and the purpose of the second foil 80*b* is to seal off the space filled with the coolant circulated for the purpose of cooling the first foil 80*a*. Without the second foil 80*b* the coolant may be circulated in the space between the target holder 4 and the first foil 80*a*, thereby cooling the side of the target holder 4 facing the beam, however this may cause contamination in the cooling system in the case of evaporation of the irradiated metal.

In the course of irradiation it is necessary to ensure that the target 42 is also cooled, as heat is released during the nuclear reactions. The cooling chamber 6 is provided for dissipating the heat. This is secured to the target holder 4 using the cooling chamber actuator 1 in a leak-proof way using an O-ring seal around the irradiated cavity 41 of the target holder 4, on the side of the target holder 4 opposite to the cavity 41. A coolant, e.g. water is circulated in the cooling chamber 6 to provide the cooling. The coolant is circulated through the inlet opening 6*a* and the outlet opening 6*b* of the cooling chamber 6. The securing of the cooling chamber 6 may be performed with, for example, springs (not depicted) besides the pressure difference being applied.

When the irradiation has been completed the cooling chamber 6 is detached using the cooling chamber actuator 1, then the target holder 4 is moved to the next irradiation position using the target holder actuator 2. As a result of this the next target 41 gets into the beam channel 11, and thereby into the path of the beam. Then, using the dissolution chamber actuator 3, the dissolution chamber 5 is moved to the irradiated target 42 that has been moved out of the path of the beam channel 11 and there it is secured to the target holder 4 in a leak-proof way so that the material of the target 42 is dissolved with the use of a suitable liquid, such as an acid or alkali, then the solution of the desired radioisotope obtained in this way is transported via capillary tube(s) out of the apparatus 10 into the hot cell.

In order to dissolve the irradiated target 42 from the target holder 4 the appropriate dissolution liquid is continuously circulated in the dissolution chamber 5 in a way so that it comes into contact with the surface of the target 42. During this the dissolution liquid is circulated into the dissolution chamber 5 through the input opening 5*a* and the solution containing the dissolved radioisotope is removed through the outlet opening 5*b*. By circulating the solvent the gas bubbles created during dissolving on the surface and the dissolved material are removed, as these slow down the dissolving process. As is known to a person skilled in the art in order to dissolve the irradiated target 42 acids, such as hydrochloric acid, nitric acid, perchloric acid, acetic acid or sulphuric acid, and alkalis, such as potassium or sodium hydroxide, may be used.

The purpose of the separation according to the present invention of the irradiation and dissolution positions within the apparatus 10 is, at the irradiation position, to not have to fill up the end of the beam channel 11 near to the target 42 with chemical, and make the walls of the beam channel 11 resistant to chemicals, and possibly contaminate the beam channel 11 with the chemicals used. In the case of a separate dissolution position it is sufficient to make the target holder 4 resistant to chemicals by anodising, for example, which is a significantly smaller component than the beam channel 11 and is easier to replace. Furthermore, while the dissolution of the irradiated target 42 is being performed, irradiation may be continued in the meantime with a new target 42, or depending on what radioisotope is to be produced, the energy of the beam and its angle of incidence may be adjusted so that afterwards the irradiation of a new target 42 may be performed for the production of a different radioisotope. As a consequence of both the dissolution and irradiation taking place at the same time, while the target holder 4 is being moved into a new irradiation position the irradiated target 42 is simultaneously taken to dissolution position.

The separation of the radioisotope from the given target 42 in the hot cell may take place with the application of an appropriate purification method known to the person skilled in the art. For example, in the case of $^{44}$Sc or $^{45}$Ti radioisotopes the purification may take place by application to DGA resin. In the case of the $^{68}$Ga radioisotope the dissolved material is bound by pressing it through Zr resin and after washing with 5 M hydrochloric acid the resin is eluted with 2 M hydrochloric acid to 1 ml TK200 resin. After being washed with 2 M hydrochloric acid the TK200 resin is eluted with 0.05 M hydrochloric acid to produce a Zn-free $^{68}$Ga solution.

The actuators used on the apparatus 10 may be pneumatic actuation cylinders or electric or magnetic actuators, or even actuators operating on the basis of another principle that enable movement in at least two directions. Optionally the target holder actuator 2 may even rotate the target holder 4 by a certain angle in addition to moving the target holder 4 perpendicular to the path of the beam, thereby changing the angle of incidence of the beam, in the case of the use of coating or foil type targets 42, for example. The purpose of being able to rotate the target holder 4 by an angle is so that the targets 42 secured on the target holder 4 may be of differing types. In other words, when after a pellet type target 42 has been irradiated and the target holder actuator 2 moves the target holder 4 to the next irradiation position, and there the target 42 to be irradiated is a coating or foil type target 42, then it should be possible to turn the target holder 4 in order to reach a smaller angle of incidence of the beam striking the coating or foil type target 42 at, thereby avoiding local overheating of the coating or foil type target 42.

The target holder 4 may be made, for example, from aluminium, magnesium, copper, silver, niobium or tantalum. Preferably materials with good heat transmittance should be selected that are less activated in the case of the use of the given beam.

The capillary tubes, liquid transport tubes used in the apparatus 10 may be made from PEEK or other plastics suitable for the purpose (e.g. FEP, PFA, PTFE).

The remote control of the apparatus 10 may be ensured with the integration of remote switches or with the use of a PLC, as is obvious for a person skilled in the art.

The object of the present invention also relates to a method for the production of radioisotopes.

Radioisotopes are produced during the method according to the invention, which method consists of the following steps:

a) inserting a target holder 4 containing a target 42 into an apparatus 10;
b) starting a beam in a beam channel 11;
c) irradiating the target 42;
d) moving the target holder 4 to the next irradiation position, thereby the irradiated target 42 gets into dissolution position;
e) securing a dissolution chamber 5 around the irradiated target 42 of a target holder 4;
f) pumping dissolution liquid into the dissolution chamber 5 and removing the solution;
g) irradiating a next target 42.

During the implementation of step a) the target holder 4 with the targets 42 is loaded into the apparatus 10.

During the implementation of step b) the beam is started in the beam channel 11 for the irradiation of the target 42 in the target holder 4 set in irradiation position.

During the implementation of step c) the target 42 is irradiated with the beam according to step b).

Following this during the implementation of step d) the target holder 4 is moved using the target holder actuator 2 so that the irradiated target 42 arrives in dissolution position.

For the dissolution, in step e) the dissolution chamber is secured around the irradiated target 42.

Then in step f) dissolution material is pumped into the dissolution chamber 5, which dissolves the desired radioisotope from the target 42 and then the solution of the desired radioisotope is transported through capillary tubes to the hot cell for further processing.

During the implementation of step g) the next target 42 that has been taken to the irradiation position during the movement of the target holder 4 in step d) is irradiated.

According to a preferred embodiment of the method according to the invention step g) starts during the performance of steps e) and/or f).

According to another preferred embodiment of the method according to the invention in a step h), before step c), a cooling chamber 6 is secured onto the target holder 4, and coolant is circulated in the cooling chamber 6 in a step i).

Additionally, following irradiation the cooling chamber 6 is separated in a step j).

The apparatus 10 according to the present invention, for example, is suitable for implementing the method according to the invention.

EXAMPLES

Example 1: Linear Target Holder 4

The embodiment according to the example is shown in FIG. 2*a*. The target holder is in a linear, strip shape and is provided with first teeth 43 on one edge. Six cavities 41 formed as blind holes are positioned on the target holder 4 at 50-mm intervals for accommodating the targets 42. The depth of the cavities 41 is 1.5 mm and their diameter is 8 mm. The material of the target holder 4 is chemical-resistant aluminium, which is able to withstand contact with the acid/alkali used during the 10 to 20-minute dissolution process. The protective coating providing the chemical resistance is created by an anodising process. In the course of this, following degreasing in a sodium hydroxide solution and rinsing, the metal is anodised in a sulphuric acid bath cooled to 2 to 4° C. at a current density of 1.5 A/dm$^2$. The electrolysis is performed for approx. two hours until a minimum 30-μm thick oxide layer is created on the surface of the aluminium. The pores of the oxide layer are sealed off by soaking in hot water following thorough rinsing in water. During the movement of the target holder 4 the target holder actuator 2 moves the target holder 4 to the individual positions of the first teeth 43. One target 42 is placed in a single cavity 41 of the target holder 4 according to the figure.

Example 2: Linear Target Holder 4

The embodiment according to the example corresponds to the embodiment according to example 1 with the difference that fourteen cavities 41 may be found on it at 40-mm intervals.

Example 3: Linear Target Holder 4

The embodiment according to the example corresponds to the embodiment according to example 1 with the difference that ten rectangular cavities 41 may be found on it, in which foil type targets 42 may be placed.

Example 4: Disc Shaped Target Holder 4

The embodiment according to the example is shown in FIG. 2*b*. The target holder 4 is in the shape of a disc, it is provided with first teeth 43 on the external edge and four cavities 41 formed as blind holes are formed in it at identical distances for accommodating the targets 42. The depth of the cavities 41 is 2 mm and their diameter is 9 mm. The material of the target holder 4 is silver.

Example 5: Disc Shaped Target Holder 4

The embodiment according to the example is shown in FIG. 2*b*. The target holder 4 is in the shape of a disc, it is provided with first teeth 43 on the external edge and four cavities 41 formed as blind holes are formed in it at identical distances for accommodating the targets 42. The depth of the cavities 41 is 2 mm and their diameter is 9 mm. The material of the target holder 4 is aluminium.

Example 6: The Use of the Apparatus 10 with a GE Cyclotron

The embodiment according to the example is shown in FIG. 1. The apparatus 10 consists of a beam channel 11 with the associated parts, namely a target holder 4 with the associated target holder actuator 2, a dissolution chamber 5 with the associated dissolution chamber actuator 3, and a cooling chamber 6 with the associated cooling chamber actuator 1.

The connection element 9 is a customary connection element 9 relating to the GE PETtrace 800 cyclotron, to which the foil holder block 8 is secured with bores, the function of which is to secure the first foil 80*a* and the second foil 80*b* in the beam channel 11. The cooling connection block 7 is connected to the foil holder block 8 with bores, through which cooling connection block 7 the helium for cooling the cyclotron may be circulated between the first foil 80*a* and the second foil 80*b*. The first foil 80*a* and the second foil 80*b* are commercially available HAVAR foils.

The target holder 4 corresponds to the embodiment according to example 1, in which isotope-enriched $^{68}$Zn powder pressed into the target holder 4 forms the pellet type target 42. After the target holder 4 is loaded into the apparatus 10, the cooling chamber 6 is secured to the target holder 4 with an O-ring seal. After being secured water is circulated in the cooling chamber 6. Following this the target 42 is irradiated with a proton beam for ten minutes while the rear side of the target holder 4 is cooled with circulating water. After the irradiation has been completed the pneumatically operating cooling chamber actuator 1 releases the cooling chamber 6, which has previously been filled with air and is therefore dry. Following this the pneumatically operating target holder actuator 2 moves the target holder 4 onwards to the next irradiation position with the use of the first teeth 43, in this way the target 42 that has already been irradiated now faces the dissolution chamber 5.

The pneumatically operating dissolution chamber actuator 3 secures the dissolution chamber 5 with the O-ring seal of the dissolution chamber 5 around the irradiated target 42 of the target holder 4 providing a leak-free seal. The $^{68}$Ga radioisotope produced during the irradiation is dissolved for 10 minutes using 5 M hydrochloric acid, circulated in the dissolution chamber 5, then the hydrochloric acid solution of the obtained radioisotope is transferred via capillary tubes to the hot cell for further processing.

The irradiation of the next target 42 may be performed during- or following the dissolution.

Example 7: the Production of $^{68}$Ga Radioisotope

Using the apparatus according to example 6, $^{68}$Ga radioisotope with an activity level of 850-1000 MBq is obtained by irradiating a pellet type target 42 formed by pressing 40 mg of isotope enriched $^{68}$Zn powder into a target holder 4 with a 10 μA proton beam for a period of 10 minutes, which was dissolved at room temperature for 10 minutes in the way mentioned in example 6 using 10 ml 5M hydrochloric acid. The solution obtained was bound by pressing through 2 ml Zr resin and after being washed with 5 M hydrochloric acid the resin was eluted with 2 M hydrochloric acid to 1 ml TK200 resin. After being washed with 2 M hydrochloric acid the TK200 resin was eluted with 0.05 M hydrochloric acid to produce a Zn-free $^{68}$Ga solution. Its suitability for radiolabelling was certified in labelling experiments performed with a DOTA chelator in a way known to the person skilled in the art. DOTA is a macrocyclic ligand used widely, as linked to various biomolecules to bind metal isotopes. In the case of 30, 10 and 3 μM DOTA concentrations, we obtained labelling efficiencies of 100, 100 and 50% respectively.

Example 8: the Production of $^{66}$Ga and $^{67}$Ga Radioisotopes

Using the apparatus 10 according to example 6, $^{66}$Ga with an activity level of 400 MBq was obtained by the irradiation of a pellet type target 42, made from 50 mg zinc powder with natural isotope composition, pressed into a target holder 4 with a 10 uA proton beam for 10 minutes followed by the dissolution of the zinc with 10 ml 5 M hydrochloric acid. The $^{66}$Ga also contained a small amount of $^{67}$Ga. The shorter half-life of $^{66}$Ga (9.49 h) makes it possible to obtain pure $^{67}$Ga (3.26 days) after the decay of $^{66}$Ga (2 to 4 days). In biodistribution experiments both radioisotopes and their mixture may be used for modelling of $^{68}$Ga, while $^{66}$Ga is suitable for producing PET images. The small amount of $^{67}$Ga does not prevent the latter use. In the case of human medical application it is necessary to use an isotope-enriched target 42 material, the processing of which corresponds to the natural zinc powder included in the example.

Example 9: the Production of $^{61}$Cu Radioisotope

Using the apparatus 10 according to example 6, a 50-µm thick zinc coating with natural isotope composition is formed on the base of the cavity 41 of the target holder 4 using an alkaline zinc sulphate solution. The zinc coating target 42 was irradiated for 60 minutes with a beam current of 10 uA. The target 42 material was dissolved with 10 ml 5 M hydrochloric acid, then the solution was applied to AG50WX8 resin. The Ga radioisotopes ($^{66}$Ga, $^{67}$Ga, $^{68}$Ga) remained on the resin, the $^{61}$Cu and Zn radioisotopes were eluted with 20 ml 5 M hydrochloric acid. The eluate was loaded on an AG1X8 anion exchange column, from which the $^{61}$Cu was eluted with 20 ml 2 M hydrochloric acid. The activity of the $^{61}$Cu obtained was 32 MBq.

Example 10: the Production of $^{89}$Zr Radioisotope

The apparatus 10 according to example 6 was used, with the difference that the target holder 4 may be rotated around its own axis so that the angle of incidence of the beam may be varied. A disc with a diameter of 8 mm cut out from 0.1 mm thick foil Y was secured in a cavity 41 of a target holder 4 by pressing in an aluminium ring with a thickness of 0.3 mm. After loading the target holder 4 into the apparatus 10 the cooling chamber 6 was secured to the target holder 4 with an O-ring seal. After securing, water was circulated in the cooling chamber 6. Using the target holder actuator 2 the target holder 4 along with the cooling chamber 6 is rotated using the target holder actuator 2 before irradiation so that the angle of incidence of the beam onto the foil is 10°. The foil was irradiated for 1 hour with a 30-µA proton beam. The material of the irradiated target 42 was dissolved with 5 ml 6 M hydrochloric acid. By diluting the solution three times, it was applied to Zr resin (Triskem), which was washed with 2 M hydrochloric acid and water. 200 MBq $^{89}$Z was eluted from the resin with 3 ml 1 M oxalic acid.

Example 11: the Production of $^{89}$Zr Radioisotope

A target 42 identical to that used in example 10 was irradiated in an apparatus 10 according to example 6 while being cooled and without rotating the target holder 4. The foil was irradiated for 1 hour with a 30-µA proton beam. The material of the irradiated target 42 was dissolved with 5 ml 6 M hydrochloric acid. After diluting the solution three times it was applied to Zr resin (Triskem), which was washed with 2 M hydrochloric acid and water. 200 MBq $^{89}$Z was eluted from the resin with 3 ml 1 M oxalic acid.

Example 12: the Production of $^{44}$Sc Radioisotope

Using the apparatus 10 according to example 6, by irradiating a pellet type target 42 obtained by pressing 120 mg Ca metal with natural isotope composition into a target holder 4 with a 30-µA proton beam for 1 hour we obtained $^{44}$Sc with an activity level of approx. 400 MBq. After being dissolved in 10 ml 3 M hydrochloric acid the Ca was bound to DGA resin, which, following 3 M hydrochloric acid washing, was eluted from the resin with 0.1 M hydrochloric acid to give approx. 300 MBq $^{44}$Sc. The $^{44}$Sc produced in this way also contains other Sc radioisotopes ($^{43}$Sc, $^{47}$Sc, $^{48}$Sc).

In order to produce nearly 100% radioisotope purity $^{44}$Sc it is necessary to use an isotope-enriched $^{44}$Ca target 42. This is not available in metal form, only in the form of CaO or $CaCO_3$ salt. Therefore, 10 mg $^{44}CaCO_3$ mixed with 90 mg Mg powder was placed in an 8 mm diameter press mould. This was pressed into a solid pellet with a pressure of 5 tonnes, then pressed into a target holder 4. The target 42 was irradiated for 30 minutes with a 10-µA proton beam. This was dissolved in 10 ml 3 M hydrochloric acid and then purified on DGA resin. The yield of the purification was approximately 80%.

Example 13: the Production of $^{45}$Ti Radioisotope

Using the apparatus 10 according to example 6, a mixture of 10 mg $Sc_2O_3$ and 100 mg Mg was pelleted and the pellet was pressed into a target holder 4. After irradiation with a 10-µA proton beam for 10 minutes $^{45}$Ti was obtained with an activity of 64.4 MBq, using the purification process according to example 12. The irradiated powder mixture was dissolved with 3 M hydrochloric acid.

Example 14: the Production of $^{52}$Mn Radioisotope

Using the apparatus 10 according to example 6, a mixture of 50 mg Cr powder and 70 mg Mg powder was pressed into a pellet with a pressure of 5 tonnes. The pellet was pressed into an aluminium target holder 4 and the target 42 was irradiated with a 10-µA proton beam for 10 minutes. The target 42 was dissolved with 10 M hydrochloric acid. The purity of the produced 102 MBq $^{52}$Mn radioisotope was 94.89%.

Example 15: the Production of $^{44}$Sc while Dissolving the Material of the Previously Irradiated Target 42

Using the apparatus 10 according to example 6, approx. 120 mg metal calcium was pressed into each of the cavities 41 of a target holder 4 and the first target 42 was irradiated for a duration of 1 hour with a 30-µA proton beam. The irradiated Ca target 42 was moved from irradiation position to dissolution position, in this way a new Ca target 42 was placed in the irradiation position. While the first batch of calcium was being dissolved the irradiation of the next Ca target 42 in line was started with identical parameters. From the first batch $^{44}$Sc with activity of 382 MBq was obtained and $^{44}$Sc with activity of 397 MBq was obtained from the second batch. A total of 7 minutes passed between the end of the first irradiation and the start of the second irradiation, therefore it was not necessary to switch off the cyclotron between production batches.

Example 16: the Sequential Production of $^{44}$Sc then $^{68}$Ga

Using the apparatus 10 according to example 6, by the sequential irradiation of 120 mg metal calcium pressed into the first cavity 41 of the target holder 4 and the 40 mg $^{68}Zn$ powder pressed into the second cavity 41 (30 minutes, 30 μA in the case of the Ca target 42 and 10 minutes, 10 μA in the case of the zinc target 42) $^{44}Sc$ isotope with an activity of 160 MBq and $^{68}Ga$ isotope with an activity of 870 MBq were produced. The irradiation of the $^{68}Zn$ target 42 was performed during the dissolution of the calcium target 42. 5 M hydrochloric acid was used for the dissolution in both cases. Based on the half-life of the produced $^{68}Ga$ (67.9 minutes) it did not contain a significant amount of $^{44}Sc$ contamination.

The advantage of the solution according to the invention is that it makes the automatic processing of coating, foil and pellet type irradiated targets 42 possible, where the dissolution is performed without removing the target 42 from the target holder 4. In this way manual processing of the target and the use of a pneumatic transport system may be avoided, which significantly reduces the radiation exposure of the operation personnel and the amount of equipment contaminated with radioactivity.

A further advantage of the invention is that several cavities 41 may be formed in the target holder 4 (depending on the size of the target holder 4 and the distance between the cavities 41) into which targets 42 may be placed. In this way constant radioisotope production may be ensured with the apparatus without further targets 42 having to be placed into the apparatus 10.

A further advantage of the invention is the provision of irradiation and dissolution positions that are independent of each other, therefore the apparatus 10 may be prepared for the next irradiation while dissolution is being performed and irradiation may even be started, thereby increasing the efficiency of the apparatus 10.

A further advantage of the present invention is that it is not only suitable for the use of coating and foil type targets 42, therefore the range of radioisotopes that may be produced with the apparatus is exceptionally wide.

The invention claimed is:

1. An apparatus (10) for the production of radioisotopes, comprising:

a connection element (9) configured to be connected to a radiation source, a foil holder block (8) connected to the connection element (9), a first foil (80*a*) secured by the foil holder block (8) in a beam channel (11) delimited by the connection element (9), a cooling connection block (7) connected to the connection element (9), a target holder (4) connected to the cooling connection block (7), a target holder actuator (2) driving the target holder, and a dissolution chamber (5) connected to the target holder (4), and a dissolution chamber actuator (3) that is connected to the dissolution chamber, wherein the target holder (4) has two or more cavities (41), wherein the two or more cavities (41) are adapted for simultaneously accommodating:

(i) a target (42) at an irradiation position in a path of the beam channel; and (ii) a second target (42) at a dissolution position spatially separated from the irradiation position and aligned with the dissolution chamber.

2. The apparatus (10) according to claim 1, wherein the target holder (4) is adapted for accommodating a pellet target, coating target, or foil target (42).

3. The apparatus (10) according to claim 1, wherein the apparatus (10) also contains a cooling chamber (6) selectively connected to the target holder (4) and a cooling chamber actuator (1) driving the cooling chamber.

4. The apparatus (10) according to claim 3, wherein the cooling chamber (6) and the dissolution chamber (5) are provided with O-ring seals.

5. The apparatus (10) according to claim 1, wherein the target holder (4) is linear or disc-shaped.

6. The apparatus (10) according to claim 1, wherein the target holder (4) is provided with teeth (43) at least on one of its edges for moving the target holder (4).

7. The apparatus (10) according to claim 1, further comprising a second foil (80*b*) secured by the foil holder block (8) in the beam channel (11), wherein the second foil (80*b*) together with the first foil (80*a*) enclose a space adapted for circulating a coolant.

8. The apparatus (10) according to claim 1, wherein a material of the target holder (4) is a chemically resistant metal.

9. The apparatus (10) according to claim 8, wherein the material of the target holder (4) is anodised aluminium.

10. A method for the production of radioisotopes using the apparatus (10) of claim 1, comprising:

a) starting a beam in the beam channel (11);

b) irradiating the first target (42) at the irradiation position;

c) moving the target holder (4) into a subsequent irradiation position;

d) securing the dissolution chamber (5) around the irradiated target (42) of the target holder (4) at the dissolution position;

e) pumping dissolution material into the dissolution chamber (5) and draining off the dissolution material; and f) irradiating a subsequent target (42) at the irradiation position;

wherein steps a)-g) are performed consecutively, and step f) is performed simultaneously with step d) and/or step e) or step f) is performed after step d) and/or step e).

11. The method according to claim 10, wherein step d), step e) and step f) take place simultaneously.

12. The method according to claim 11, wherein the apparatus (10) further comprises a cooling chamber (6) selectively connected to the target holder (4) and a cooling chamber actuator (1) driving the cooling chamber, the method further comprising:

g) securing the cooling chamber (6) on the target holder (4) before step b);

h) circulating coolant in the cooling chamber (6) simultaneously with step b); and i) separating the cooling chamber (6) from the target holder after step h).

* * * * *